(12) United States Patent
Marler et al.

(10) Patent No.: US 8,984,563 B2
(45) Date of Patent: Mar. 17, 2015

(54) IDENTIFYING ANCILLARY INFORMATION ASSOCIATED WITH AN AUDIO/VIDEO PROGRAM

(71) Applicant: Intel Corporation, Santa Clara, CA (US)

(72) Inventors: Jerilyn L. Marler, Beaverton, OR (US); Mary J. Lalomia, Portland, OR (US); David B. Kinder, Portland, OR (US); Jason T. Cassezza, Aloha, OR (US); Scott Casey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/132,025

(22) Filed: Dec. 18, 2013

(65) Prior Publication Data

US 2014/0146232 A1     May 29, 2014

Related U.S. Application Data

(63) Continuation of application No. 13/090,596, filed on Apr. 20, 2011, now Pat. No. 8,635,651, which is a continuation of application No. 12/477,278, filed on Jun. 3, 2009, now Pat. No. 8,001,569, which is a continuation of application No. 10/931,386, filed on Sep. 1, 2004, now Pat. No. 7,559,073, which is a continuation of application No. 09/429,057, filed on Oct. 29, 1999, now abandoned.

(51) Int. Cl.
*H04N 5/445*     (2011.01)
*G06F 3/00*     (2006.01)
*G06F 13/00*     (2006.01)
*H04N 7/088*     (2006.01)
*H04N 21/462*     (2011.01)
(Continued)

(52) U.S. Cl.
CPC ............... *H04N 5/445* (2013.01); *H04N 7/088* (2013.01); *H04N 21/4622* (2013.01); *H04N 21/4782* (2013.01); *H04N 21/8586* (2013.01)
USPC .................................. 725/60; 725/40; 725/61

(58) Field of Classification Search
USPC .............................................. 725/40, 60, 61
See application file for complete search history.

(56) References Cited

U.S. PATENT DOCUMENTS 5,778,181 A    7/1998   Hidary et al.
5,903,816 A    5/1999   Broadwin et al.
(Continued)

FOREIGN PATENT DOCUMENTS

CN     ZL00815038.9     6/2007
EP     1224803     8/2004
(Continued)

OTHER PUBLICATIONS

"Advanced Television Enhancement Forum Specification (ATVEF)", Comment Draft Version 1.011, XP-002142688, 1998.

*Primary Examiner* — Hunter B Lonsberry
(74) *Attorney, Agent, or Firm* — Trop, Pruner & Hu, P.C.

(57) ABSTRACT

A system communicates video information including television content associated with a plurality of channels and ancillary information. Information may be transmitted with the ancillary information that is indicative of the type of content included in the ancillary information. This provides the user, in one embodiment of the present invention, with a visual indication of the type of information that accompanies television content. This helps the user to decide whether the user wishes to view the ancillary information and provides the opportunity to select that enhancement for viewing.

18 Claims, 4 Drawing Sheets

(51) Int. Cl.
*H04N 21/4782* (2011.01)
*H04N 21/858* (2011.01)

(56) References Cited

U.S. PATENT DOCUMENTS

| | | | |
|---|---|---|---|
| 5,929,849 | A | 7/1999 | Kikinis |
| 5,940,073 | A | 8/1999 | Klosterman et al. |
| 6,025,837 | A | 2/2000 | Matthews, III et al. |
| 6,061,719 | A | 5/2000 | Bendinelli et al. |
| 6,177,931 | B1 | 1/2001 | Alexander et al. |
| 6,182,287 | B1 | 1/2001 | Schneidewend et al. |
| 6,240,555 | B1 | 5/2001 | Shoff et al. |
| 6,557,172 | B1 | 4/2003 | Carr et al. |
| 6,574,795 | B1 | 6/2003 | Carr et al. |
| 7,493,636 | B2 | 2/2009 | Kitsukawa et al. |
| 7,559,073 | B2 | 7/2009 | Marler et al. |
| 8,065,701 | B2 | 11/2011 | Hattori et al. |
| 8,635,651 | B2 * | 1/2014 | Marler et al. ............ 725/60 |
| 2002/0059590 | A1 * | 5/2002 | Kitsukawa et al. ............ 725/36 |

FOREIGN PATENT DOCUMENTS

| | | |
|---|---|---|
| JP | 11-17633 | 1/1999 |
| JP | 11-53441 | 2/1999 |
| JP | 11-298822 | 10/1999 |
| JP | 2003513557 | 4/2003 |
| JP | 4271398 | 3/2009 |
| WO | 9741690 | 11/1997 |
| WO | 9817064 | 4/1998 |
| WO | 9853611 | 11/1998 |
| WO | 9915968 | 4/1999 |

* cited by examiner

IDENTIFYING ANCILLARY INFORMATION ASSOCIATED WITH AN AUDIO/VIDEO PROGRAM

CROSS-REFERENCE TO RELATED APPLICATIONS

This application is a continuation of U.S. patent application Ser. No. 13/090,596, filed on Apr. 20, 2011, which is a continuation of U.S. patent application Ser. No. 12/477,278, filed on Jun. 3, 2009, which issued as U.S. Pat. No. 8,001,569 on Aug. 16, 2011, which is a continuation of U.S. patent application Ser. No. 10/931,386, filed on Sep. 1, 2004, which issued as U.S. Pat. No. 7,559,073 on Jul. 7, 2009, which is a continuation of U.S. patent application Ser. No. 09/429,057, filed on Oct. 29, 1999, now abandoned.

BACKGROUND

The invention relates to communicating ancillary information associated with a plurality of audio/video programs, such as television content associated with a plurality of channels.

Ancillary information, such as program sub-titles, emergency messages, closed caption messages, and program guide information, may be transmitted with regular television content. Other types of ancillary information that may be sent with television content include enhancement data such as web pages, multimedia information, or other digital data files. Ancillary information may be sent in the vertical blanking interval (VBI) of an analog television broadcast signal. Alternatively, the ancillary information may be sent with digital television content over a digital transport medium.

Various standards exist that provide for transmission of ancillary information with television content. One standard is the Advanced Television Enhancement Forum (ATVEF) Specification, Draft Version 1.1r26, dated Feb. 2, 1999. The ATVEF Specification is designed to provide for transmission of enhancement data along with television content in both analog and digital systems, such as cable systems, satellite systems, terrestrial systems, and so forth. The combination of the enhancement data and the television content may be referred to as enhanced television content. Enhanced television content provides more information and options to viewers. For example, a viewer may be presented with the option of viewing advertisements, educational information, and so forth, while watching regular television programming.

The transmission of ancillary information may be signified to the user by displaying an icon indicating that enhanced information accompanies the programming currently displayed. This alerts the user to the possibility that additional information is available but provides nothing useful to help the user decide whether or not the user wishes to review the information.

Thus there is a continuing need for better ways to give the user more information about the ancillary information that may have been transmitted with television content.

SUMMARY

In accordance with one aspect, a method may include transmitting video data. Ancillary information associated with the video data is also transmitted. Information may be transmitted that may be used to identify the content included in the ancillary information.

Other features and embodiments will become apparent from the following description and from the claims.

DETAILED DESCRIPTION

Figure 1:
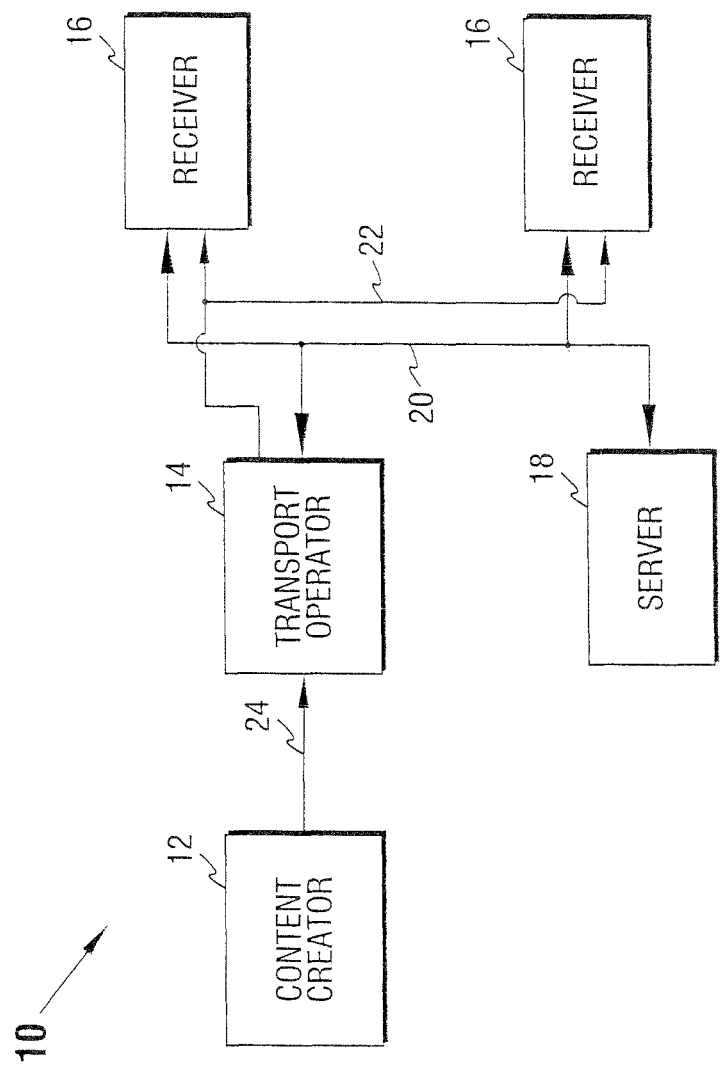
FIG. 1 is a block diagram of one embodiment of an information delivery system in accordance with the present invention.

Referring to FIG. 1, an information delivery system 10 according to one embodiment of the invention includes a content creator 12, a transport operator system 14, and a plurality of receivers 16. The receivers 16 may be located at various receiving sites, including homes, offices, entertainment facilities, or other locations. The content creator 12 originates enhancement data (or other type of ancillary information) and television content (or other type of content including audio and/or video data) to be transmitted by the transport operator system 14. Alternatively, the content creator 12 may create enhancement data with television content provided by another source to the transport operator system 14. Enhancement data may include graphics (e.g., web pages, multimedia information, or other digital data files), presentation layout, and synchronization information. The combination of the enhancement data and television content is referred to as enhanced television content.

The transport operator system 14 provides an enhanced television content delivery infrastructure that may include terrestrial, cable, satellite, or other types of transmission facilities (either analog or digital). The television content and enhancement data may be transmitted over a transport medium 22, which may be a terrestrial, cable, satellite, or other type of link, to the receivers 16. The receivers 16 may include televisions, set-top boxes, personal computers, or other types of systems adapted to receive television content and associated enhancement data.

As used in this description, the term audio/video (A/V) content is intended to include any type of audio and/or video data that may be transmitted or distributed to one or more receiving sites for presentation to viewers and/or listeners. As used here, A/V content may refer to content that may include both an audio and a video portion or one of an audio or video portion. Further, ancillary information other than enhancement data may be transmitted with the A/V content. For example, ancillary information may include program sub-titles, emergency messages, closed caption messages, and program guide information.

The receivers 16 may further be coupled to a secondary link 20 that may be a data delivery communications channel such as the Internet, a DOCSIS network (which is an interface for cable modems), or other communications link (whether uni-directional or bi-directional). DOCSIS stands for Data Over Cable Systems Interface Specifications, and is described in DOCSIS, Version 1.0, dated March 1998, as provided by the International Telecommunication Union (ITU). The secondary link 20 may be coupled to the transport operator system 14 and/or to one or more servers 18. According to some embodiments, portions of enhancement data associated with the A/V content transmitted over the transport medium 22 may be communicated over the secondary link 20 from the transport operator system 14, the one or more servers 18, or some combination of such systems.

In an alternate embodiment, another type of secondary data path can be part of the A/V transmission itself, but not tightly tied to a particular A/V channel. For instance, in MPEG-2 based systems such as ATSC (Advanced Television Systems Committee) or DVB (Digital Video Broadcasting), transport stream programs correspond to what is commonly thought of as TV channels. MPEG stands for Moving Picture Experts Group, and the MPEG-2 standard is described in ISO/IEC 13818-1 (MPEG-2 Systems), ISO/IEC 13818-2 (MPEG-2 Video) and ISO/IEC 13818-3 (MPEG-2 Audio), dated in 1994 and provided by the International Organization for Standardization (ISO) and the International Electrotechnical Commission (IEC). A description of ATSC may be found in "Guide to the Use of the ATSC Digital Television Standard," dated October 1995. DVB standards may be available from the web site {http://www.etsi.org}.

These transport stream programs can contain audio, video, and data (e.g., ancillary information), with all of them tightly associated with that single transport stream program. When a user tunes to the transport stream program, the receiving device knows the audio, video, and data that are associated because they are marked as all being part of the same program.

One standard for describing transmission of enhancement data with television content is the ATVEF specification, with one version described in ATVEF Specification, Draft Version 1.1r26, dated Feb. 2, 1999. Enhancement data may be transmitted in a number of different ways from the transport operator system 14 to the receivers 16, depending on the type of transport medium 22. For example, with an analog transport medium such as the National Television System Committee (NTSC) Standard of the Electronics Industries Association, portions of the enhancement data may be sent in the vertical blanking interval (VBI) of the NTSC transmission. A description of NTSC may be found in the book, "Video Demystified: A Handbook For the Digital Engineer" by Keith Jack, published by HighText Publications (2d Ed. 1996). Other types of transport media (analog or digital) may provide different mechanisms of communicating the enhancement data.

Enhancement data according to the ATVEF Specification may include enhancements each having the following components: an ATVEF announcement, a resource, and a trigger. The three components may be transmitted using Internet Protocol (IP) multicast to the receivers. An IP multicast standard is described in Request for Comment (RFC) 1301, entitled "Multicast Transport Protocol." RFCs may be available at website address {http://www.ietf.org/rfc.html}.

Generally, an ATVEF announcement indicates that enhancement data is being transmitted, a resource includes one or more files that contain the enhancement data, and a trigger synchronizes the enhancement data with the TV transmission. An announcement may describe the location of both the resource stream and the trigger stream. For each television (TV) channel, one or more enhancements may be offered as choices presented to the user, who can select which of the enhancements, if any, to view. The ATVEF Specification may utilize a one-way transmission protocol (the Unidirectional Hypertext Transfer Protocol or UHTTP, described in the ATVEF Specification) to deliver resource data.

The announcements, resources, and triggers associated with an A/V channel may be delivered at about the same time as, and with the transmission of, the A/V content on that channel. Conventionally, for each enhancement, the resource stream may be delivered along with the announcement, with the resource stream stored locally in the receiver 16. If a viewer so desires, the enhancement data can be retrieved at the receiver from local storage for viewing.

To provide for greater flexibility and/or to alleviate bandwidth concerns of the transport medium 22, some embodiments of the invention transmit (using IP multicast) enhancement data associated with multiple A/V channels (e.g., TV channels) over a link that is separate from the transport medium used to transmit A/V content. Alternatively, the link may be part of the same delivery mechanism as the A/V content but is not associated with any A/V channel, e.g., an MPEG-2 transport stream with ancillary information in a data-only program separate from the A/V programs. The separate delivery mechanism to deliver the A/V content may be a separate transport stream or a separate link 20 such as a general purpose data link or some other type of communications link. Thus, according to some embodiments, enhancement data is separated from the A/V data at the transport operator system 14 (or alternatively, at another source), with the A/V content transmitted over the transport medium 22 and the enhancement data transmitted over the secondary link 20 (or a separate transport stream).

In the ensuing description, reference is made to receiving enhancement data received over the secondary link 20; however, it is contemplated that the enhancement data or other type of ancillary information may be received over a separate transport stream such as that used with MPEG-2 delivery systems. In addition, reference is made to tuning to a specific A/V channel (e.g., TV channel) at the receiving end. It is contemplated, however, that the receiver system can be tuning instead to one of the A/V transport stream programs in an MPEG-2 based systems.

Thus, generally, tuning to an A/V program may include tuning to A/V channels (e.g., TV channels), to transport stream programs (e.g., in an MPEG based system), or to other separations or segments of A/V content. Also, associating ancillary information with an A/V program can thus refer to associating ancillary information with an A/V channel, a transport stream program, or other A/V separations or segments.

Figure 2:
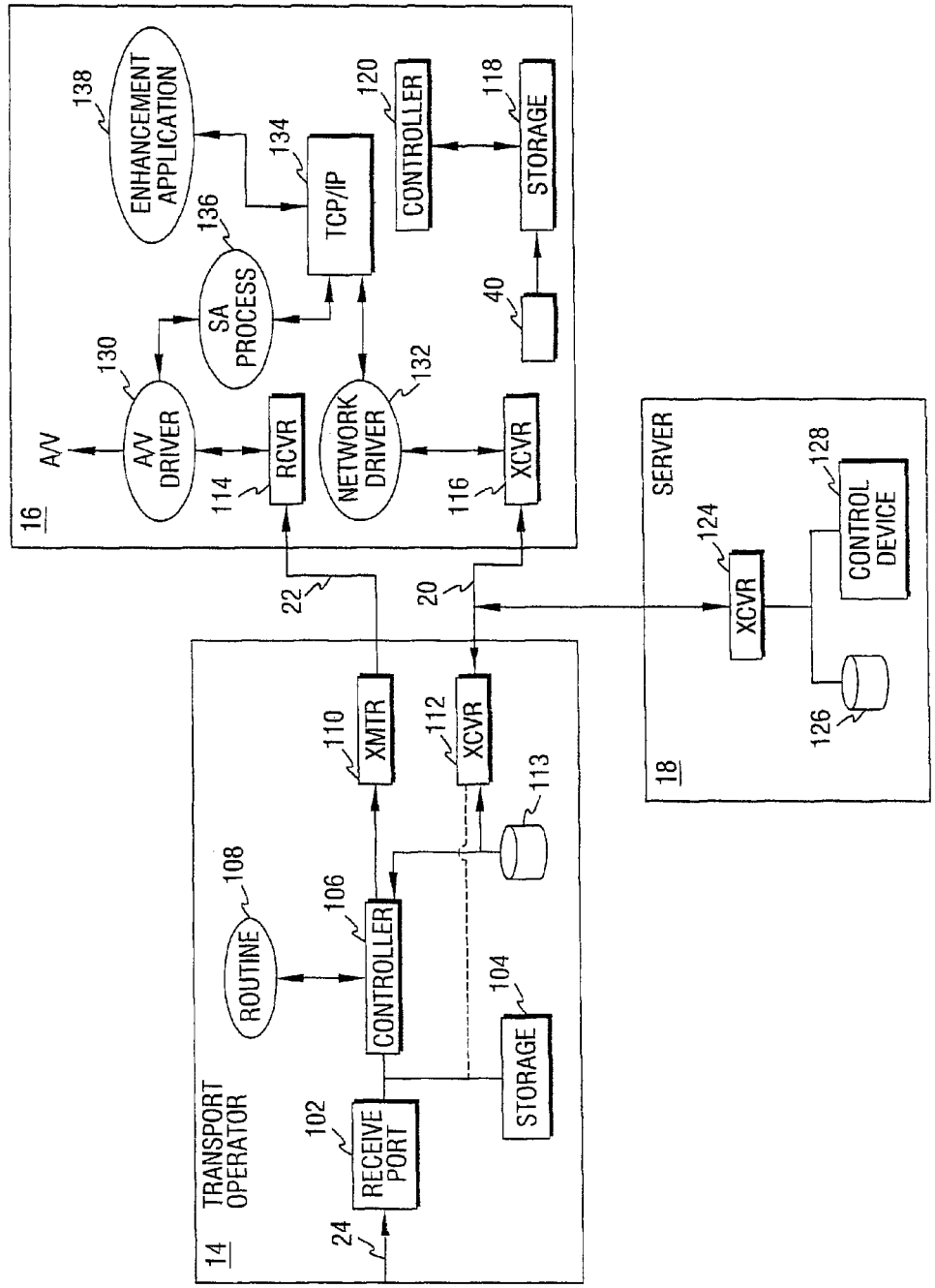
FIG. 2 is a block diagram of a transport operator system, receiving system, and server according to one embodiment of the information delivery system of FIG. 1.

Referring to FIG. 2, the transport operator system 14, receiving system 16 and the server 18 in the system 10 of FIG. 1 are illustrated. The transport operator system 14 may include a receiving port 102 to receive information from the content creator 12 over a link 24. The received enhancement data may be provided to a controller 106 in the transport operator system 14. A/V content may be received with the enhancement data through port 102 or through a separate A/V receive port (not shown). The controller 106 may be run under control of a software routine 108 (referred to as a transport routine). The transport routine 108 may initially be stored in a storage medium 104 and loaded by the controller 106 for execution. Instructions and data of the transport routine 108 may also be stored in the storage medium 104. The controller 106 may create special announcements to be transmitted with enhancement data over a separate link (e.g., link 20). The enhancement data and special announcements may be stored in a storage medium 113, which may be transmitted over the secondary link 20 through a transceiver 112.

Alternatively, the enhancement data and special announcements may be transmitted over the transport medium 22 with the A/V content but in a separate transport stream program. In the latter embodiment, different parts of the transport routine 108 (or alternatively, different routines) may handle transmission of both the A/V content and the enhancement data and special announcements. The transceiver 112 may be a telephone modem, a cable modem, or any other type of analog or digital transceiver or transmitter, including a satellite transmitter, adapted to communicate over the secondary link 20.

Enhancement data may be stored in a storage medium 126 in the server 18 in addition to, or instead of, the enhancement data stored in the transport operator system 14. The server 18 further includes a transceiver 124 coupled to the secondary link 20 and a control device 128. More than one server 18 may be coupled to the secondary link 20 to store additional enhancement data. Alternatively, a plurality of servers 18 may be coupled to the receivers 16 over separate links.

In the receiving system 16, a receiver circuit 114 (e.g., a TV tuner card) is adapted to receive content over the transport medium 22 and a transceiver 116 is adapted to communicate over the secondary link 20. The receiving circuit 114 may be associated with an A/V device driver routine 130 that forwards the received A/V content to application software adapted to process and present the A/V content in the receiving system. The transceiver 116 may be associated with a network device driver 132 to receive enhancement data from the link 20.

Figure 3:
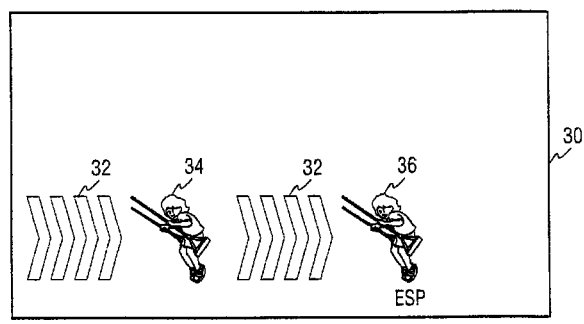
FIG. 3 is a view of a screen display in accordance with one embodiment of the present invention.

In one embodiment, the network device driver 132 may send received data to a TCP/IP (Transmission Control Protocol/Internet Protocol) stack 134. TCP is described in RFC 793, entitled "Transmission Control Protocol," dated September 1991. Data flows through the TCP/IP stack 134 to application software, including an enhancement routine 138 for receiving and processing enhancement data and a special announcement routine (SA process) 136 to receive and process special announcements. In an alternative arrangement, the SA process 136 may be part of the enhancement application 138. The application routines, device drivers, and other routines or programs may be executable on a controller 120. Such routines or programs may be initially stored in a storage medium 118 and loaded by the controller 120 for execution. The SA process 136 is capable of associating enhancement data received over the secondary link 20 to the currently tuned A/V channel. The SA process 136 may then combine the associated enhancement data with the A/V content of the currently-tuned TV channel for presentation. Alternatively, the enhancement data and special announcements may arrive in a separate transport stream program (e.g., such as those in MPEG based systems) over the transport medium 22, in which case it may be different parts of the SA routine 136 (or different routines) that process receipt of the enhancement data and Referring next to FIG. 3, in accordance with one embodiment of the present invention, the user may be given information about the ancillary information that may have been transmitted with the television content. For example, in accordance with one embodiment of the present invention, a chevron-shaped indicator 32 may be displayed on the display 30 of a receiver 16 to indicate the transmission of ancillary information in general. An additional indicator 34 may be provided to give information about the particular type of content provided as ancillary information. Thus, the indicator 34 may be indicative of children's content. An additional indicator 36 may be provided to indicate that the children's content is available in Spanish. Additional indicators may be provided as well.

The indicators may provide information about the ancillary information, such as enhancement data, that has been provided with the television content. This gives the user greater information about the ancillary information, enabling the user to make an informed decision about whether or not to access the ancillary information. In some cases, the icons 32, 34, and 36 may be hyperlinks that allow the user to mouse click on the icon (or use another pointing device) and to jump immediately to the ancillary information.

Figure 4:
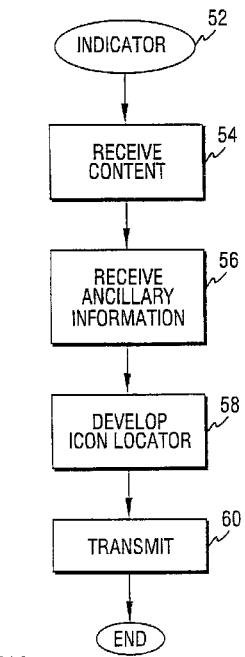
FIG. 4 is a flow chart showing software resident on the content creator in accordance with one embodiment of the present invention.

Software 52 resident on the server 18 or content creator 12, for example, may begin by receiving content to be transmitted as indicated in block 54 of FIG. 4. Next, as indicated in block 56, the content creator receives the ancillary information that is to be transmitted in association with the content previously received. Based on the content of the ancillary information, an icon locator is developed as indicated in block 58. The icon locator provides a pointer to the location of information about a content-identifying icon. The icon may be a graphical symbol that indicates the nature of all or part of the content in the ancillary information. Finally, the content, the ancillary information, and the icon locator are transmitted through the transport operator 14 to the receivers 16 (block 60).

Figure 5:
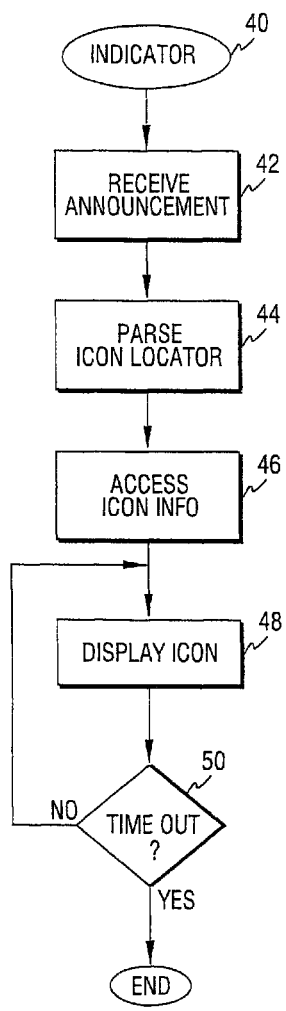
FIG. 5 is a flow chart showing software resident on a receiver in accordance with one embodiment of the present invention.

FIG. 5 illustrates implementing one embodiment of the present invention. Software 40, resident on a receiver 16, begins by receiving an announcement stream as indicated in block 42. The announcement stream is parsed to locate an icon locator, as indicated in block 44.

The icon locator may take a variety of forms. In one embodiment of the present invention, the icon locator may be a uniform resource locator (URL). The URL may point to an Internet web address containing information about a suitable icon that may be displayed to provide the user with information about the content contained within the ancillary information. Alternatively, the URL may point to a location in the transmitted ancillary information that may be utilized to access and then display a suitable icon.

Alternatively, a local identifier (LID) may be provided. Particularly where the information is not necessarily available on an on-demand basis, a local identifier or LID may be utilized to provide a name for a resource such as a content-identifying icon. The use of a LID supports cross-references within the content to the resource. The LID may be useful in creating hyperlinks or embedding one piece of content in another. The LID scheme enables content creators to assign unique identifiers to each resource relative to a given name space.

Thus, the LID may be utilized to access the icon information repeatedly. Once the icon has been stored on the receiver and is identified through the LID, it can be called up repeatedly and used over and over again. For example, in one embodiment of the present invention, the receiver may be loaded with a plurality of content-identifying icon images before those images are actually needed. The icon code for one of those icons may be sent with an announcement stream that identifies the icon already on the receiver.

A LID or URL may be transmitted as part of a trigger. Triggers are real time events delivered for enhanced television programs. A receiver may set its own policy for allowing users to enable or disable enhanced television content and triggers may be utilized as a signal to notify users of enhanced content availability. Triggers generally include a URL and may optionally also include a human readable name, an expiration date, and script. The expiration date in connection with triggers utilized to announce the arrival of a particular type of content may provide for a limited duration of display of the icon. For example, the expiration date may also cause the icon to disappear and reappear periodically.

In some embodiments of the present invention, the user may select from among a plurality of pre-received icons that identify content that the user is interested in knowing about. Other icons may be left unselected. When information of a type corresponding to a selected icon is received, the pre-selected icon may be displayed.

In accordance with one embodiment of the present invention, the announcement stream may include script that causes a transparent overlay to be produced over the display image on the display 30 of a receiver 16. The transparent overlay may include one or more icons to identify the content that accompanies the enhanced television content. In one embodiment of the invention, a plurality of icons indicating available content may be displayed alternately.

Thus, returning to FIG. 5, after the icon locator has been parsed, the icon information may be accessed (block 46) either from the local system or from the Internet as two examples. One or more icons are then displayed as indicated in block 48. If an expiration time was transmitted with the trigger data, a check at diamond 50 determines whether the expiration time has occurred. If so, the flow ends. Otherwise, the icon persists.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method, the method comprising:
    receiving a user selection of a category of information of interest to the user;
    automatically determining whether video data has associated ancillary information, the ancillary information related to the category of information of interest to the user;
    receiving the ancillary information and an identifier of a location of at least one visual indication indicative of the ancillary information; and
    providing at least one visual indication to indicate to the user the availability of the ancillary information, wherein at least one visual indication comprises an image.

2. The method of claim 1, wherein at least one visual indication comprises a graphical symbol.

3. The method of claim 1, wherein the requesting to display at least one visual indication comprises a requesting to access content using a uniform resource locator.

4. The method of claim 1, wherein the identifier of a location of at least one visual indication comprises a uniform resource locator.

5. The method of claim 1, wherein the identifier of a location of at least one visual indication describes where the image visual indication is stored.

6. The method of claim 1, wherein the ancillary information comprises one or more of graphics, web pages, multi-media content, digital files, presentation layout information, and synchronization information.

7. A computer-readable medium storing instructions, which when executed, cause a computer to:
    access received user selection of a category of information of interest to the user;
    automatically determine whether video data has associated ancillary information, the ancillary information related to the category of information of interest to the user;
    receive the ancillary information and an identifier of a location of at least one visual indication indicative of the ancillary information; and
    provide at least one visual indication to indicate to the user the availability of the ancillary information, wherein at least one visual indication comprises an image.

8. The computer-readable medium of claim 7, wherein at least one visual indication comprises a graphical symbol.

9. The computer-readable medium of claim 7, wherein the request to display at least one visual indication comprises a request to access content using a uniform resource locator.

10. The computer-readable medium of claim 7, wherein the identifier of a location of at least one visual indication comprises a uniform resource locator.

11. The computer-readable medium of claim 7, wherein the identifier of a location of at least one visual indication describes where the image visual indication is stored.

12. The computer-readable medium of claim 7, wherein the ancillary information comprises one or more of graphics, web pages, multi-media content, digital files, presentation layout information, and synchronization information.

13. A system comprising:
    at least one memory and
    at least one processor configured to:
        access received user selection of a category of information of interest to the user;
        automatically determine whether video data has associated ancillary information, the ancillary information related to the category of information of interest to the user;
        receive the ancillary information and an identifier of a location of at least one visual indication indicative of the ancillary information; and
        provide at least one visual indication to indicate to the user the availability of the ancillary information, wherein at least one visual indication comprises an image.

14. The system of claim 13, wherein at least one visual indication comprises a graphical symbol.

15. The system of claim 13, wherein the request to display at least one visual indication comprises a request to access content using a uniform resource locator.

16. The system of claim 13, wherein the identifier of a location of at least one visual indication comprises a uniform resource locator.

17. The system of claim 13, wherein the identifier of a location of at least one visual indication describes where the image visual indication is stored.

18. The system of claim 13, wherein the ancillary information comprises one or more of graphics, web pages, multi-media content, digital files, presentation layout information, and synchronization information.

* * * * *